United States Patent Office 3,074,914
Patented Jan. 22, 1963

3,074,914
CYCLOBUTANE DERIVATIVE POLYMERS
Ardy Armen, Concord, Calif., assignor to The Dow Chemical Company, Midland, Mich., a corporation of Delaware
No Drawing. Filed Apr. 4, 1957, Ser. No. 650,570
8 Claims. (Cl. 260—78)

The chief aim and concern of the present invention is to provide novel linear condensation polymers of the polyamide, polyester and polyamide-ester types that contain various recurring cyclobutane derivative constituents in their molecular configurations. The inventive design also contemplates advantageously high molecular weight, including fiber-forming, embodiments of such polymeric compositions.

The polymeric compositions that are within the purposive comprehension of the present invention are selected from the group of linear condensation polymers consisting of those which are inclusively represented by the following generic formulae:

(1) $\{CO-B-X-Y-Z\}_k$
(2) $\{NH-B-X-R-CO\}_k$
and
(3) $\{CO-Q-CO-G\}_k$ in each of which B is a bivalent or difunctional cyclobutane radical that is free from and does not contain substituent groups on the cyclobutane ring structure, such as

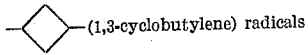
(1,3-cyclobutylene) radicals

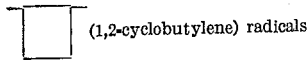
(1,2-cyclobutylene) radicals and

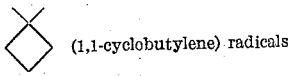
(1,1-cyclobutylene) radicals

R is an alkylene group of from 2 to 10 carbon atoms; Y is a bivalent radical selected from the group consisting of those included in the groups mentioned for the radicals B and R; Z is selected from the group consisting of the dyads —NH— and —O—; X is selected from the group consisting of the dyads —CONH— and —COO—; G is a bivalent radical from a heterocyclic diamine (such as piperazine and substituted piperazines); Q is selected from the group consisting of 1,1-cyclobutylene and 1,2-cyclobutylene and $k$ is a plural integer. Polymers in which $k$ has a numerical value of at least about 20 may frequently be found to be beneficial for many purposes. Those in which the value of $k$ is at least 50 may often be observed to possess advantageous fiber-forming utilities and are usually adapted to provide filamentous structures that are orientable by stretching and the like procedures after their initial formation. In this connection, the fiber-forming capabilities of polymeric compositions that are in accordance with the present invention generally stand in close relationship to the reduced viscosities of the polymers, as may be determined by measurement of a 0.5 percent by weight solution of the polymer in formic acid at a temperature of about 35° C. Polymers whose so measured reduced viscosities in formic acid are greater than about 0.21 are ordinarily good fiber-formers. The reduced viscosity can be defined by and determined in and with the following equation:

$$\text{Reduced Viscosity} = \frac{\left(\frac{\text{Viscosity of Solution}}{\text{Viscosity of Solvent}}\right) - 1}{\text{Concentration of Solution}}$$

The difunctional cyclobutane groups that are free from ring substituents may be readily furnished in the polymeric compositions of the invention by utilizing such compounds for the polymer preparations as are represented by means of the following formulae:

(4) 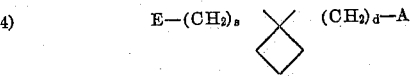

(5) 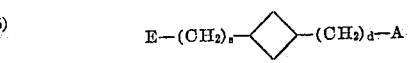

and
(6) 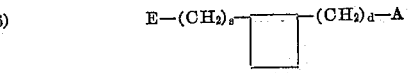

in which E and A may be selected, on an independent basis, from the group consisting of hydroxy (—OH), amino (—NH$_2$), carboxy (—COOH), and carboxy ester (—COOR) radicals and $s$ and $d$ may be independent numerical values from zero to 2.

Typical cyclobutane derivative compounds which may be utilized with particular benefit to provide linear condensation polymers in accordance with the present invention include diphenyl cyclobutane-1,1-dicarboxylate; cyclobutane-1,2-dicarboxylic acid; cyclobutane-1,3-dicarboxylic acid; spiro-3,3-heptane-2,6-dicarboxylic acid; and spiro-3,3-heptane-2,6-diamine.

The polymeric compositions of the invention may be prepared in accordance with any of the several satisfactory procedures for the manufacture of condensation polymers of the indicated types, depending upon the particular starting materials that are employed.

Surprisingly enough, and contrary to what might be expected from the propensity of the cyclobutane ring to cleave under many conditions, the difunctional, unsubstituted cyclobutane derivatives are substantially or completely stable under most polymerization conditions and remain cyclically intact despite the elevated temperatures that are encountered. In some cases it may be suitable to directly condense equivalent weight proportions of diverse, non-ring substituted cyclobutane derivative compound species that have appropriate functional terminal groups for the intended purpose. More often, it may be an advantage to condense each equivalent weight of a cyclobutane derivative compound (or a mixture of such compounds) with an equivalent weight proportion of an appropriate and desired diamine, alcamine, dihydroxy compound, dicarboxylic acid or the like bifunctional compound including various heterocyclic diamines. As will be obvious to those skilled in the art, the most favorable reaction conditions, including the necessity for employing and the choice of specific catalysts, will depend to a great extent upon the particular reactants which may be involved in a desired condensation.

Quite frequently, it may be most beneficial, in order to readily prepare polyamide or polyamide-ester compositions in accordance with the invention, to initially form an amine salt of a cyclobutane derivative carboxylic acid compound and to subsequently derive the condensed polymeric product from such intermediate salt. In an analogous manner, polyesters may be furnished readily by directly condensing cyclobutane derivative carboxylic acid compounds with suitable glycols. Similar and related techniques may be relied upon for the preparation of other of the amide, ester and amide-ester linked polymeric compositions that are within the purview of the invention.

As is apparent in the following specification and description, the polymeric compositions may vary from those which are relatively low in molecular weight and which may have viscid and elastomeric physical characteristics to crystalline high polymers that are fusible only under the influence of heat at markedly elevated temperatures. The first-mentioned variations may frequently be employed with advantage in adhesive and binding compositions, for coatings of various sorts and to provide molding and other shapable compositions by either direct employment or in advantageous blends with other polymers. The latter variations, as has been indicated, are oftentimes found to be eminently suited for fiber-forming and equivalent applications, probably because of the stiffening effect which is exerted on the polymer chain by the cyclobutane derivative constituents thereof. In addition, especially in the case of the polymers which contain more symmetrical cyclobutane derivative constituents, the crystallinities and melting points of the polymer products of the invention are considerably greater than are those of their completely straight chain polymeric analogs with which they may be compared. Likewise, the moduli of elasticity of fibers drawn from analogous linear, straight chain, fiber-forming condensation polymers are noticeably less than are the same characteristics of fibers drawn from polymeric compositions according to the present invention, especially those containing symmetrical cyclobutane derivative constituents.

The various polymers, including certain fiber-forming embodiments, that, by way of further illustration, are hereinafter specifically represented afford docent exemplification of the multitudinous species that are advantageously possibilitated by practice of the invention. All of the cyclobutane derivative polymers that are included in Table II were prepared by one of the three procedures that are set forth in the following Table I. The melting points of the intermediate salts that were employed to prepare the polyamides that were made according to procedures A, B and C are also listed in Table II. All of the intermediate salts that were employed were prepared by combining methanolic solutions of equivalent amounts of dibasic cyclobutane derivative of carboxylic acids in the indicated diamines. If the salts that were formed did not precipitate from methanol, ether was added until the salts became cloudy and precipitation began. The isolated salts were then recrystallized and polymerized.

Table I.—Preparation of Linear Cyclobutane Derivative Condensation Polymers

| Procedure | Used to prepare polymers [1] | Details of procedures |
|---|---|---|
| A | 3, 4, 5 and 6 | The intermediate salt was heated in an evacuated sealed tube at a temperature of 20° C. for 2 hours. After cooling, the seal of the tube was broken and the tube additionally heated for 3 hours at a temperature of 260° to 280° C. under an absolute mercury pressure of 0.5 to 2 mm. |
| B | 1, 2, and 3 | Diphenyl cyclobutane dicarboxylate and an equivalent weight of diamine were heated in a sealed tube at 220° C. at 14 hours; then at atmospheric pressure under a nitrogen atmosphere at 260° C. for 45 minutes; and finally at 3 mm. Hg pressure at 270° C. for 3 hours. |
| C | 8 | The dicarboxylic acid was suspended in excess ethylene glycol (1:3 mole ratio) and a catalytic amount of litharge or zinc borate was then added. The resulting mixture was heated in a nitrogen atmosphere at 210° C. for 4 hours; then at 280° C. for 1 hour; and finally under vacuum at 270° to 280° C. for 3 hours. |

[1] See Table II for identification of specific polymers.

Table II.—Cyclobutane Derivative Polymers

| Polymer No. | Composition | Prepared by procedure in Table I | Melting point of intermediate salt, 0° C. | Melting point, ° C. | η sp./c. | Remarks |
|---|---|---|---|---|---|---|
| 1 | —CO—◇—CONH(CH₂)₆—NH— | D | (¹) | 185 | 1.05 | Cold-drawable fibers ffrom colorless polymer. |
| 2 | —CO—◇—CO—N◯N— | D | (¹) | >320 | 0.05 | Brittle polymer. |
| 3 | —CO—□—CONH(CH₂)₆—NH— | A, D | 200-201 | | 0.12 | Colorless, sticky polymer. |
| 4 | —CO—◇—CO—NH(CH₂)₆NH— | A | 218-219 | 285 | 0.21 | Formed a nonviscous melt. |
| 5 | —CO—◇—CO—NH(CH₂)₃OCH₂CH₂O(CH₂)₃NH— | A | 193-195 | 145 | 0 24 | Yielded rubber, cold-drawable filaments. |
| 6 | —CO—◇—CO—NH(CH₂)₁₀NH— | A | 194-195 | 220 | 0.33 | Cold-drawable fibers from melt. |
| 7 | —CO—◇—COOCH₂CH₂O— | E | (¹) | | 0.34 | Sticky at room temperature. |

¹ Not involved.

It is interesting to note that polymer 3 was prepared by both procedures A and DD, but neither polymer yielded a viscous material.

The scope and purview of the present invention is to be gauged in the light of the hereto appended claims rather than strictly from the foregoing illustrative description and specification.

What is claimed is:

1. A polymeric composition selected from the group of linear condensation polymers consisting of recurring units of the polymer units represented by the following generic formulae:

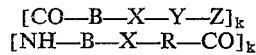

and

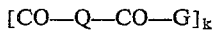

in each of which B is a bivalent cyclobutane radical of 4 carbon atoms that is free from ring substituent groups;

R is an alkylene group of from 2 to 10 carbon atoms; Y is a bivalent radical selected from the group consisting of those included in the groups mentioned for the radicals B and R; Z is selected from the group consisting of the dyads —NH— and —O—; X is selected from the group consisting of the dyads —CONH— and —COO—; G is a bivalent radical from a heterocyclic diamine; Q is selected from the group consisting of 1,1-cyclobutylene and 1,2-cyclobutylene and $k$ is a plural integer.

2. A polymeric composition in accordance with claim 1 in which R is 1,3-cyclobutylene.

3. A polymeric composition in accordance with claim 1 in which R is 1,2-cyclobutylene.

4. A polymeric composition in accordance with claim 1 in which R is 1,1-cyclobutylene.

5. A polymeric composition in accordance with claim 1 in which k has a numerical value of at least about 20.

6. A polymeric composition in accordance with claim 1 having a reduced viscosity greater than about 0.21 as determined by measurement of a 0.5 percent by weight solution of the polymer in formic acid at a temperature of 35° C.

7. A ploymeric composition represented by the formula:

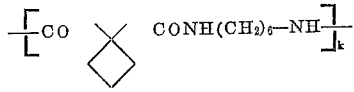

in which $k$ is a plural integer.

8. A polymeric composition represented by the formula:

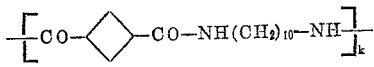

in which $k$ is a plural integer.

References Cited in the file of this patent

UNITED STATES PATENTS

| | | |
|---|---|---|
| 2,130,523 | Carothers | Sept. 20, 1938 |
| 2,268,586 | Gilman | Jan. 6, 1942 |
| 2,284,896 | Hanford et al. | June 2, 1942 |
| 2,389,662 | Fisher et al. | Nov. 27, 1945 |
| 2,750,411 | Fisher et al. | June 12, 1956 |
| 2,913,433 | Wittbecker | Nov. 17, 1959 |

FOREIGN PATENTS

| | | |
|---|---|---|
| 461,237 | Great Britain | Feb. 9, 1937 |

UNITED STATES PATENT OFFICE
CERTIFICATE OF CORRECTION

Patent No. 3,074,914 January 22, 1963

Ardy Armen

It is hereby certified that error appears in the above numbered patent requiring correction and that the said Letters Patent should read as corrected below.

Column 4, Table 1, third column, line 2 thereof, for "20° C." read -- 220° C. --.

Signed and sealed this 20th day of August 1963.

(SEAL)
Attest:

ERNEST W. SWIDER
Attesting Officer

DAVID L. LADD
Commissioner of Patents